United States Patent [19]

Parker et al.

[11] 4,173,519

[45] Nov. 6, 1979

[54] METHOD, PROCESS, SYSTEM, AND APPARATUS FOR RECOVERING METAL VALUES FROM ORES

[76] Inventors: Trent J. Parker, 1880 Laurel Hurst Dr., Salt Lake City, Utah 84108; Harmel A. Dawson, 1043 Barbara Pl., Salt Lake City, Utah 84102

[21] Appl. No.: 958,539

[22] Filed: Nov. 7, 1978

[51] Int. Cl.$^2$ ............................ C25C 1/20; C25C 7/00
[52] U.S. Cl. ..................................... 204/110; 204/233; 75/105; 75/118 R; 75/121
[58] Field of Search .................... 204/233, 234, 110; 75/105, 118, 121

[56] References Cited

U.S. PATENT DOCUMENTS

| | | | |
|---|---|---|---|
| 2,067,014 | 1/1937 | Morris | 75/105 |
| 2,293,066 | 8/1942 | Lord | 75/105 |
| 3,357,823 | 12/1967 | Tuwiner | 75/105 |

*Primary Examiner*—R. T. Andrews
*Attorney, Agent, or Firm*—M. Ralph Shaffer

[57] ABSTRACT

A method, process, system, and apparatus for recovering metal values such as gold and silver from ores. The process contemplates the prior separation, through appropriate apparatus, of primary slimes from the coarse fraction of ores and each fraction is processed separately and by particular methods most suitable for maximum economic recovery of metal values from each fraction. The coarse fraction materials are routed to constitute one leg of the method to a series of heap-leach piles that are processed in a totally distinct manner by a very low trickle (0.0002 gal/sq.ft./min) of required strength cyanide solution. Metal values are thereby obtained in solution high enough to pass direct to electro-winning cells by-passing expensive intermediate concentrating steps. The primary slime fraction of the ores is routed to constitute a second leg of the process to soak-leach tanks for extraction of metal values without agitation, or by agitation if required, by the carbon-in-pulp adsorption-desorption process with a low cyanide (1 lb. per ton) concentration. In a preferred form of the invention, as to the pregnant solution derived from the heap-leach process and the carbon desorption solution derived through the soak-leach process involving the primary slimes, both are routed to an electro-winning stage for metal values recovery. A sluice box can also be used within the system to provide for separate recovery of large gold particles.

13 Claims, 1 Drawing Figure

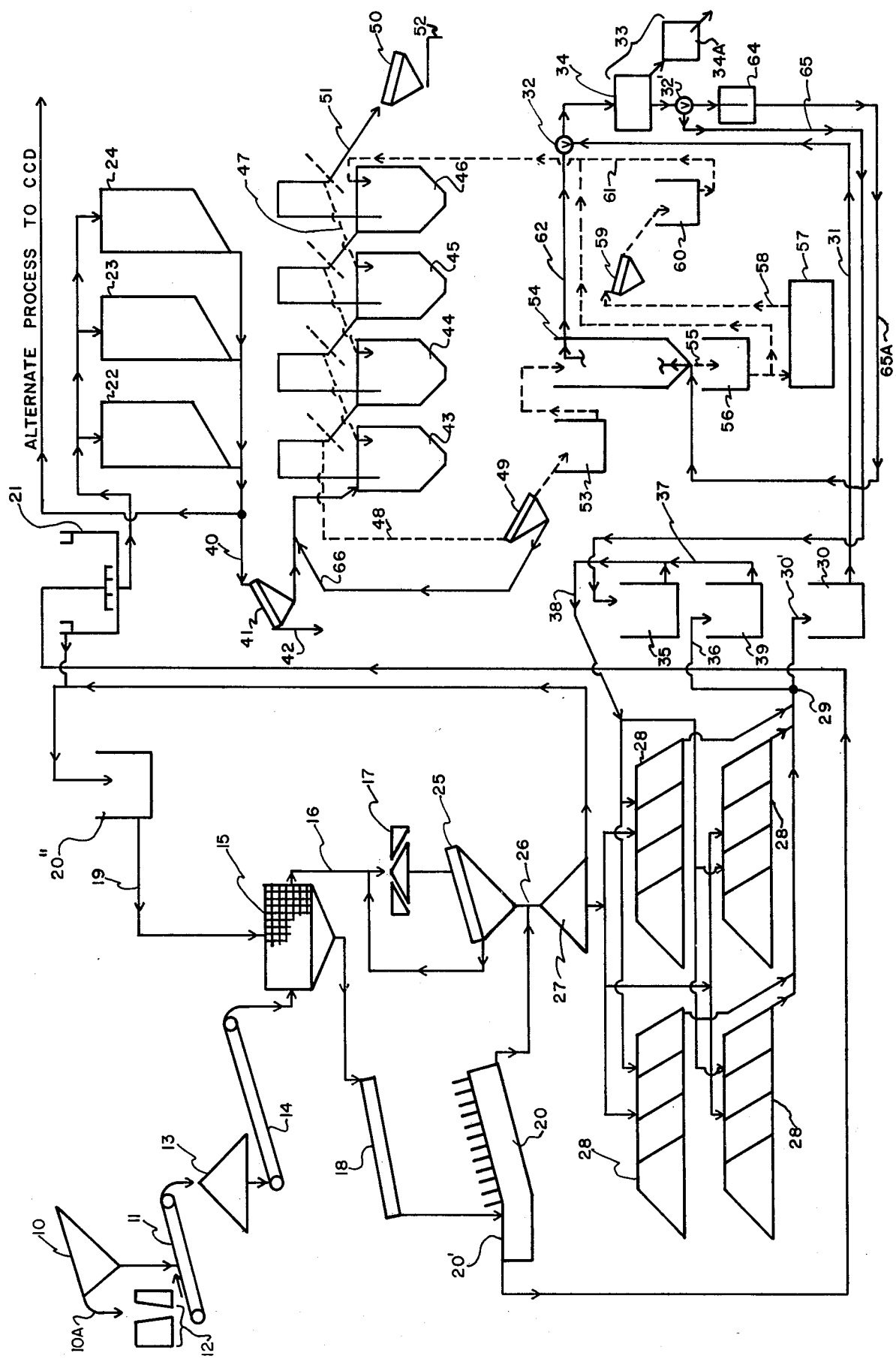

METHOD, PROCESS, SYSTEM, AND APPARATUS FOR RECOVERING METAL VALUES FROM ORES

FIELD OF INVENTION

The present invention relates to the recovery of metal values from ores and, more particularly, to a method, process, system and apparatus for facilitating economically the recovery from ores, even low grade ores, metal values from both primary slimes and deslimed heap-leach portions.

DESCRIPTION OF PRIOR ART

Certain prior United States patents are representatives of prior art in the field and are listed as follows:

| | | |
|---|---|---|
| 413,686 | 650,019 | 1,033,359 |
| 549,736 | 696,274 | 1,291,824 |
| 641,818 | 886,900 | 2,009,667 |
| 646,006 | 1,002,447 | 3,777,004 |

Thus, the recovery of precious metal values by cyanide solutions, and leaching by virtue of the standard heap-leach process, are standard in the art.

Certain ones of the patents, such as prior U.S. Pat. No. 1,033,359 address themselves to the problem of clays that adhere to smaller stones or pieces of bedrock and the fact that such clays may contain precious metal values. In the invention herein, primary slimes will include clays which are defined as (Tyler Series) 48 mesh minus materials. Prior methods include washing rocks with water to recover clays, flotation methods, see U.S. Pat. No. 1,291,824, chlorination, and so forth.

The above patents do not teach, nor is there believed to be known from other sources, the concept of separating the primary slimes, and then separately processing this fraction of materials by the soak-leach process, and larger sized materials by the heap-leach process.

OBSERVATIONS AND INITIAL DEVELOPMENT WORK LEADING TO THE INVENTION

It is well recognized that the State of Nevada has extensive ore deposits of gold and silver. In these deposits, as well as in deposits in other states and localities, there has been found to occur an appreciable amount of slimes or fines, i.e., −48 mesh or finer, which are herein conjointly identified as "slimes", in the ore material. Such slimes drastically inhibit the degree of success that has heretofore been achieved in connection with recovery of precious metal values from such ore. Extensive investigations have been made in connection with the character of such slimes, resembling fine-particle clays of bentonitic type, and the effect of such slimes in the presence of ores undergoing treatment for precious metal values.

In prior art processes, heap-leach piles and leaching solutions have been used, but with the slimes not pre-separated out, in various Nevada mining areas; however, a majority of these projects have failed, certainly from an economic point of view, since the slimes plastering over rocks and interstices of heap-leach piles have prevented any advantageous recovery of pregnant solutions or have allowed leaching fluids to percolate therethrough.

Other processes have included ball- or rod-milling of the entire ore down to a fine grind, i.e. −200 mesh; but here again both capital operating costs are excessive even though the percentage recovery in the leach tanks, where agitators must be employed, can approximate that obtained in the present invention.

Initial observations have been that the presence of such slimes, especially in the presence of water or an aqueous leaching solution, will tend, as to certain clay minerals, to hydrolize and swell in size both at the areas of interstices of the rocks as well as over the surfaces of the rocks or ore particles themselves. Accordingly, there is a reduction in porosity of the rocks and also a plastering, in effect, of areas between the rocks, thereby precluding proper percolation of leaching solutions through heap-leach piles, for example. Through experimentation, an initial discovery and necessary parameter was realized in that these slimes must be eliminated and, as later developments showed on ores with proper characteristics, separately treated as by a soak-leach process. Considering the first leg of the present invention, i.e. the heap-leach process, it is to be noted from the information that follows hereinafter, that the heap-leach piles can be constituted by material reduced solely to −6 mesh, or mesh required from an initial pre-separation of mine-run ore of 2 inch minus material. It will be seen that a further grinding step is rendered unnecessary for the heap-leach process, thus substantially reducing horsepower requirements otherwise needed in prior art processes, reducing materials handling, labor costs, capital costs and so forth.

Special note is to be taken that a vast majority of the ore, thus, is processed according to the heap-leach process, and this with the further advantage in the present invention of reduced leaching-solution flow rates, this being made possible by virtue of the fact that the fines or slimes have been hitherto removed for separate processing. Such an advantage markedly reduces the need for large water storage facilities, reduces water use, pumping costs, and eliminates certain prior art "char" (i.e. charcoal or carbon) recovery that would otherwise be required for removing gold and silver values from the solutions. It will be seen that the pregnant liquor derived from the heap-leach piles can be routed directly to the electro-winning stage without further processing.

Returning to the second leg of the process involving the soak-leach tanks, the slimes are processed herein using conventional counter-current decantation (CCD) and/or counter-current carbon-in-pulp processing, but without requiring agitation or stirring equipment in the tanks. It has developed, through repeated investigation and experimentation, that char use as may be necessary for processing with the slimes is drastically reduced as to amount needed, since a majority of the material is already being processed in the first leg of the process relative to heap-leaching. Accordingly, the process can be abbreviated considerably from prior art processes in processing the fines or slimes for the recovery of gold and silver values.

Another feature of the invention is that pregnant solutions directly derived from the heap-leach piles and also the solution derived from the soak-leach leg, with char processing, can be alternately routed to the electro-winning process so that a single stage can be employed to satisfy the requirements of both legs of the process, albeit alternately.

BRIEF DESCRIPTION OF THE INVENTION

In accordance with the above, the present invention comprises a process, apparatus, system and method wherein initial mine-run ores are reduced or crushed such that a 2 inch minus supply is obtained. At this point, the slimes or fines (−48 mesh) are separated out using a screen and a classifier, for separate processing in soak-leach tanks, inter alia. A sluice box is advantageously used, the latter for separating out large gold particles. The classifier is employed to separate +48 mesh material and add the same to the drain stock pile of the first leg process. The drain stock pile is used to form a series of heap-leach piles that employ a low trickle or flow rate relative to standard leaching solutions, so that a high percentage of metal values can be recovered in the pregnant solutions derived therefrom. But it is to be noted that the drain stock pile, shown in the drawings appended hereto, does not and cannot constitute a heap-leach pile per se, but rather is used so that a shovel or other equipment can take material from the drain stock pile and essentially blend the same so that homogeneous heap-leach piles are produced.

The second leg of the process includes soak-leach tanks and other equipment for deriving precious metal values in an entirely separate process, this from the slimes initially separated out as aforementioned.

OBJECTS

A principal object of the invention is to provide a new and improved method, process, and also apparatus for the recovery of metal values, especially precious metal values, from ores.

A further object is to separate primary slimes from coarse ore, such slimes in this case being defined as of the order of −48 mesh materials including clays, and separately process these materials in a unique manner, but leaving the remaining material for constitution of heap-leach piles that will not clog and whose porosity is not reduced relative to the subsequent heap-leach process employed.

A further object is to provide a composite system for separately treating slimes and heap-leach piles so as to minimize both capital and operating expenses and at the same time recover metal values comparable to full agitation leaching.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole FIGURE is a schematic representation of the process, method and apparatus used in connection with practicing the invention in a preferred embodiment thereof.

DESCRIPTION OF PREFERRED EMBODIMENTS

In the drawing, mine-run ore is deposited upon and fed through grizzly 10 and fed to conveyor 11 as shown. Bar spacing of the grizzly is preferably of the order of two inches, but in any event is no less than one-half inch. Optionally, other devices such as shaking screens and so forth may be employed at 10; however, a grizzly is preferred, with oversized materials at 10A being fed into primary crusher 12. This primary crusher will generally take the form of a jaw or gyratory crusher which crushes the ore to two inches or less. In any event, the maximum size of the crushed ore produced should not be less than one-half inch. Notwithstanding this, it is best for the crusher to crush to an ore particle size of two inches minus.

The material from conveyor 11 is deposited onto a crushed ore stock pile 13. Material therefrom is deposited on the feed end of conveyor 14 and is fed by such conveyor to a separating device such as trommel screen 15. Screen 15 is chosen to be of the order of 6 mesh, Tyler series, so that over-sized materials as do not pass through the screen are transported via path 16 to a crusher such as a gyro-disc crusher 17. Minus 6 mesh materials, however, will pass through the trommel screen to be routed to sluice box 18. It is noted that the trommel screen is run wet, with the introduction of water via path 19 from water storage 20''. The sluice box is employed to recover relatively large-sized gold values, with the remainder of the minus 6 mesh materials being deposited at the feed end 20' of classifier 20. Classifier 20 separates out the slimes, which are routed via thickener 21 to a series of slime soak-leach tanks 22, 23, and 24. The combination of crusher 17 and 6 mesh (all mesh sizes being Tyler Series standard) vibrating screen 25 is to produce a deslimed crushed material at junction 26 which combines with the deslimed material leading from classifier 20 to go into a drain stock pile 27. This stock pile is used to form a group of heap-leach piles which may be disposed in series, parallel, series-parallel, and so forth. In any event, the heap-leach piles are designated as the leach piles 28 toward the lower center of the drawings.

Heap-leach piles per se and prior-art technology applying thereto are well known. As is customary, some care here must also be taken in the construction of the bases of the piles so that recovered values are not lost. A calcium, sodium- or potassium cyanide solution is employed, and is sprayed, trickled or poured over the heap leach-piles so as to permeate and percolate through the pile, carrying silver and gold values in the resultant pregnant liquor to the output flow at junction 29. But herein, this pregnant solution enters container 30 to be routed via path 31 to three-way valve 32 that leads, as per this invention, directly to the electro-winning structure at 33. It is to be herein observed at this juncture that: the now-operative slow-rate and low-rate of application of the leaching liquids (aqueous solution of calcium-sodium-or potassium cyanide to as low as 0.0002 gal/sq.ft./min.), sprinkling intermittently as necessary to facilitate such low flow rate, to the heap-leach piles 28, is made practical through the prior separation of the slimes; by such low flow rate there results higher concentration of leached values, and this now renders possible the direct routing of such pregnant leaching solutions directly to the electro-winning stage without prior char, resin, or zinc-precipitation treatment. The flow rate above mentioned is approximately one-twentieth of standard flow rates in the art.

Structure 33 generally will comprise an electrolytic stage 34 wherein the cathode is made of steel wool, for example. The cathode, recovering the metal values, will be fed into furnace 34A so that the customary Doré bullion is obtained. Barren solution is recovered from the electro-winning electrolysis stage 34 and is fed through valve 32' via path 65 to container 35 for one valve setting (32') as shown.

When valve 32' is set at its alternate position, then the solution passes from stage 34 through stage 64 to char desorption tank 54.

Junction 29 also may be supplied with a control valve or other means so that in the event the pregnant solution is not rich enough with mineral values, the same may be recirculated along paths 36 and 37, so that the same can be routed along path 38 to constitute the liquid to be percolated through the leach piles. The solution may be enriched or replenished with calcium - sodium- or potassium cyanide at barren solution stage 35, wash solution stage 39 or at any convenient point so that the desired concentration of cyanide in the aqueous solution may be present.

We shall now return to a consideration of the slime material, the second leg derived from classifier 20 and routed to thickener 21. It is noted that the thickened material, as aforesaid, is routed to slime soak-leach tanks, wherein again calcium- sodium- or potassium cyanide is introduced in the tanks 22–24 for the recovery of metal values. The outputs from the soak-leach tanks are fed together at path 40 and routed to a tramp oversize removal screen 41 from which oversized materials are removed as tailings at 42. This is to ensure that oversized materials as might possibly be present in the tanks 22–24 are not fed to the char adsorption tanks at 43–46. Accordingly, the soaked slimes are deposited in several tanks at series 43–46, with char being advanced by screens 47 in a counter-current direction such that "char" (i.e., charcoal or carbon) or a resin in lieu of charcoal, may adsorb the precious-metal soak-solution values and be routed with the char adsorption media along path 48 to char washing screen 49. The spent slimes, of course, are routed to safety screen 50 via path 51, wherein the char caught by the safety screen 50 is routed back to tank 46, then passing through safety screen 50 and going to tailings pond 52.

The precious-metal-values' loaded char descends via path 48 to screen 49 and from here to storage tank 53 and from there advances to the char desorption column 54. Stripped char descends via path 55 to the stripped char storage vessel 56, wherein a portion of the char is subjected to thermal reactivation at stage 57, the remainder being recycled back directly to path 61. The reactivated char is routed via path 58 to sizing screen 59 and from there descends to reactivated char storage at vessel 60. From this point the char assumes the path 61 to tank 46 such that the char is re-introduced successively in the char adsorption tanks proceeding to tank 43 and from there to char screen 49 in a counter-current direction as aforesaid. Values from the char desorption column are fed via path 62 to valve 32 wherein it alternates, with the pregnant liquor recovered from the heap-leach piles, to proceed to the electro-winning structure 33 comprising electrolysis stage 34 and Doré furnace 34A. The stripped solution proceeds from the electrolysis stage 34 and descends through valve 32' to container 64 which is a stripped-solution storage container and heat-exchanger unit. The stripped solution, when used, assumes the path 65A back to the char desorption column 54.

Liquid coming through the washing screen 49 is fed, with its values and slimes, back to the series of char adsorption tanks 43–46 via path 66.

Even at very low solution flow rates through column-leaching simulating the heap-leach process, and recycling of low grade solutions, relatively high-grade pregnant liquors 30' can be obtained from which values can be extracted by electrolysis directly, with char extraction or zinc precipitation not being required and over-all water requirements being reduced.

Laboratory testing has shown that high gold and silver recoveries, as to the slimes, can be obtained (90% plus for gold and 75% plus for silver) by soaking the slimes of ore that is amenable, in a lower concentration cyanide solution (1 pound, e.g., NaCN per ton solution) which is employed in the soak-leach process, the slimes being soaked in tanks 22–24 for a period of approximately 48 hours after initial mixing, and no agitation or stirrers are required. Column leaching, to simulate heap-leach, on deslimed crushed rock, shows residues of 0.01 ounce gold and 0.95 ounce silver are possible, relative to feed as described in the following paragraph, after 21 days trickle leach using 6.0 pounds, e.g., sodium cyanide per ton aqueous leach solution. Char-in-pulp systems are recommended, see the drawing, for the soak-leach slurry to recover gold and silver values. The char is stripped with caustic-cyanide solutions and the values are recovered from the solutions by electrolysis.

It must be emphasized at this point that the process of the present invention accomplishes, (A) as to the slime-separation and soak-leach of the slimes, a result which could only be obtained by state-of-the-art stirrer and agitator processes where the feed is reduced and ground to 80%–200 mesh; and, as to the heap-leach process herein (B) a greatly increased concentration of recovered metal values in the pregnant solution derived from heap leaching since, because the heaps are deslimed: (1) the leaching process will be fully operative and (2) low-flow-rate application of the leaching solution, with drastically reduced water requirements, is now rendered possible for effectively indicating, in the leaching process through a succession of descending solution layers in the heap, a precipitating out and then redissolving, successively, of metal values so that the ultimate, recovered pregnant solution is of high concentration.

The advantages are readily ascertained by the following CALCULATED COMPARATIVE RESULTS table from a representative ore*tested:

| CALCULATED COMPARATIVE RESULTS | | | | |
|---|---|---|---|---|
| | Prior Art Conventional 48 Hr. Agitation Leach | | Soak-Heap Leach | |
| | Gold | Silver | Gold | Silver |
| Leached Values (oz/T) | 0.068 | 3.15 | 0.070 | 3.25 |
| Residue (oz/T) | 0.012 | 1.05 | 0.010 | 0.95 |
| *Feed Analysis | 0.080 | 4.20 | 0.080 | 4.20 |
| Per Cent Leached | 85.000 | 75.00 | 87.5000 | 77.38 |
| Cyanide Added, Lb/Ton Solution | 6.0 | | $6.0^a$–$1.0^b$ | |
| Cyanide Consumed, Lb/Ton | 2.0 | | 2.8 | |
| Lime Consumed - Ca(OH)$_2$ lb/T Ore | 6.0 | | 4.0 | |
| Indicated Crush or Grind | 80% - 200M | | 100% - 6M | |
| Power for Crush &/or Grind -HP/short ton | $17.0^c$ | | $3.2^d$ | |
| Power for Pumping & Mixing -HP/short ton | 8.0 | | 1.5 | |

$^a$Heap
$^b$Soak
$^c$Crush and Grind
$^d$Crush only

To be emphasized are the many advantages including reduced labor costs, since the majority (e.g., 75%) of the tonnage is simply reduced to size amenable to heap-leaching. Also, since the slimes are pre-eliminated from the heaps to be leached, water requirements are reduced because of the low solution-flow to and through the heaps. Reduced power costs are obtained because ball-mill or rod-mill grinding is not required, no agitation is necessary for the leach, either at the heaps or at the slimes, and considerably less pumping of slurry is required. And use of char is drastically reduced as it is now employed only with about e.g. 25% of the material, i.e. in the soak-leach leg of the process where it is most effective.

Care should be taken to employ good design and operation of the primary slime removal structure. Care is likewise needed, of course, in draining, mixing and stacking the heap material to prevent segregation of fines which could cause channeling or even prevent solution flow (note the pre-drain feature). Special care is needed in the design of pads underneath the several heaps, to prevent losses of high-grade solutions obtained.

The solution-treatment of the slimes, other than agitation which is here eliminated, will be a straight-forward process using currently known technology.

The operation of the invention is as follows. At the outset, it is noted that the crux of the invention resides in the initial stages of the process and apparatus, namely, in the feature that, with a minimum of crushing or other reduction, the slimes are removed from those materials which later constitute the heat-leach piles, and are separately routed to an independent and separate soak-leach process. Thus, the mine-run ore is reduced as by a jaw crusher at 12 initially, to rough, coarse 2 inch materials which constitutes the crushed ore stock pile 13, rather than at this point crushing the material to size required for heap leaching. The material is fed through the trommel screen 15, operated wet, and this without next-prior crushing, so that the material routed through the sluice box 18 to recover coarse-metal values and the primary slimes can be separated by classifier 20 and such slimes routed directly to the thickener 21 and slime soak-leach tanks 22-24. Once these fines or slimes are removed, then the remaining material is reduced to heap-leach size and this combined with the classifier sands 20 so that a stock (drain) pile 27 is produced. After this drainage, this drained stock pile is used to make one or a series of heap-leach piles as is shown in the lower left of the drawings. The calcium-sodium-or potassium cyanide solution at this point becomes effective in flowing over and percolating through the heap-leach piles, to pick up precious metal values to constitute the pregnant liquor solution at 29 and 30. Experimentation has shown that were the slime materials not initially removed and simply all of the incoming materials reduced to a size for heap-leach prior to desliming, the soak-leach process would be drastically reduced as to efficiency and recovering. Where slimes present in the heap-leach piles at 28, such slimes would hydrolize, form a solution-impermeable barrier within the heaps, and would thus prevent the calcium-sodium-or potassium cyanide solution from properly leaching values from the heaps; further, were such slimes present in the heap-leach heaps or piles, permeability and porosity of the individual rocks, particularly when these are wetted, would be materially reduced. Experimentation has amply illustrated that the separation of the slimes is essential to make heap-leaching operable and to increase gold and silver recovery from the coarse materials in the heap-leach piles.

As to the slime material leading from classifier 20 to thickener 21, it has been noted that the gold in such slimes constitutes very fine gold particles requiring different process methods, than for gold recovery from the coarse materials. This is why the slime material to recover such gold values is routed differently, and employs a different process, note the drawing at the upper right hand quarter thereof, than the leaching phenomenon that takes place at heap-leach piles 28.

The employment of slimes soak-leach tanks, and the countercurrent employment of activated char for producing materials that can be recovered through an electro-winning process as at 33, is well known, other than the present invention's feature of non-agitation. Desorption processes as to char, thermal reactivation, and so forth are likewise well known in the art as to stages 54, 56, 57 and 59 and 60. What is important here is that at the initial stage of the process, immediately subsequent to an initial reduction of the mine-run ore to $-2$ inch and in no event less than $-\frac{1}{2}$ inch, the fines or slimes are separated out for independent processing by the soak-leach tanks 22-24 and are involved in a process totally separate from the heap-leach piles' process used for the coarse materials. In the latter case the deslimed materials from the classifier at 20 are easily combined with the crushed material from the output of the trommel screen 15 and gyro-disc crusher 17, so that these materials may constitute the heap-leach piles, mostly (90%) free of slimes, and hence are readily conditioned for use in the heap-leach process.

Again, in practicing the process, ball mills and rod mills are not needed to crush all of the input resulting in reduced capital costs. Less equipment is employed. Likewise, since slimes are routed to the soak-leach tanks, then stirrers are eliminated and power costs reduced. Because of reduced capital and operating costs, values from lower grade gold and silver ores can be recovered profitably.

The slurry at 40 can be routed to a CCD (countercurrent decantation) process for values' recovery by the standard Merrill Crowe method, well known in the art, in lieu of carbon-in-pulp recovery detailed in the drawings and description herein.

"Slimes" as defined herein and in the appended claims consists of $-48$ mesh "fines", i.e. materials. Depending upon the type of ore being processed, it may well be that the offending fines will comprise clays or actual slimes of the order of 250-400 mesh. However, it is economically impractical to make cuts at these screen or sieve sizes; economies are achieved, for some ores at 100 mesh, for example, but for all ores at least $-48$ mesh, this also guaranteeing a separation of a majority of all of those fines which would otherwise tend to deter proper heap-leaching, as well as ensure a most efficient soak-leach recovery.

Added advantages of heap-leaching herein include: greatly reduced channeling in the leached pile since the same is initially deslimed, and facility for building higher piles than is usual, thus reducing (1) cost/ton of ore processed, (2) unit-amortized construction cost of pile base, and (3) material handling cost.

For greatest recovery, silver generally requires an increased strength of cyanide solution concentration as does gold. In the heap-leaching herein, and depending upon the relative gold and silver bearing content thereof, solution strength will vary preferably from 1 to 10 lbs. of cyanide salt (calcium, sodium or potassium) per ton solution, with low flow rates (0.005–0.0002 gal/sq.ft. surface area/ton) being used to achieve highest leached values recovery.

While the leaching soltuions herein have been described specifically as cyanide solutions, and such are particularly useful for leaching gold and silver values, it will be understood from extensive prior- and existing-art processes that other leaching solutions or solvents can be employed, depending upon the type of ore being processed and the particular values to be recovered, e.g., water, sodium chloride, chloride leaching agent, sodium hydroxide (for uranium recovery), ammonia (for copper recovery), sulfuric acid, etc.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A method of recovering metal values from mined ore, comprising the steps of: providing a quantity of said ore; separating from said ore quantity a majority of the slime material therein; processing the so-separated slime material in slime soak-leach tanks to recover metal values therefrom; separately processing a remainder of said ore quantity, from which said majority has been removed, in heap-leach piles to derive a pregnant liquor; and processing said pregnant liquor to derive metal values therefrom.

2. A method of recovering metal values from mined ore, comprising the steps of: separating from said mined ore a majority of slime material contained therein; processing said slime material with a cyanide solution in a soak-leach tank to derive a useful product therefrom from which metal values can be recovered; and processing a remainder of said ore in a heap-leach pile process to derive a pregnant liquor that can be further processed to recover metal values therefrom.

3. A process for recovering precious metal values from mined ore, comprising: wet-classifying some of said ore to separate out a majority of slime material in said ore, whereby to produce a slurry; subjecting said slurry to soak-leaching for producing a product that can be processed to recover metal values therefrom; collecting remaining ore from said wet-classifying step to allow the same to drain in a drain stock pile; and reconstituting said remaining ore into at least one heap-leach pile for subjection to cyanide solution percolation therethrough, whereby to derive a pregnant solution that can be further processed to recover metal values therefrom.

4. The process of claim 3 wherein, before said wet-classifying step there is provided an initial step of reducing said ore to crushed material, and depositing at least a portion of said crushed material onto said drain stock pile.

5. A method for recovering at least one precious metal from crushed ores, comprising the steps of separating out and separately processing a majority of slime materials from said ores to produce a soak-leaching product whereby to recover precious metal values therefrom; and heap-leaching a remainder of said ores, from which said majority has been separated, whereby to derive a pregnant liquor from which precious metal values can be recovered.

6. The method of claim 5 wherein there is included the final step of alternately and separately electro-winning said pregnant liquor and said soak-leaching product.

7. A method of recovering at least one metal value from crushed ore, comprising the steps of: removing a majority of slime materials from said ore; building a heap-leach pile from a remainder of said ore not including the so-removed materials; leaching said metal value from said heap-leach pile with a leaching solution applied to said pile at the rate of from 0.005 down to 0.0002 gal/sq. ft. pile surface area/min.

8. The method of claim 7 wherein said leaching solution is intermittently applied.

9. The method of claim 7 wherein said leaching solution comprises an aqueous cyanide solution having therein one of a class of cyanide salts comprising sodium cyanide, potassium cyanide, and calcium cyanide.

10. Apparatus for recovering metal values from mined ore, including, in combination: first means for producing ore material; second means operatively disposed with respect to said first means for receiving said material to separately produce two ore-material streams, a first of slime material and a second of essentially deslimed material; third, slime soak-leach tank means for receiving, from said second means, and processing said slime material to derive metal values therefrom in one process; fourth, heap-leach means for receiving and processing said deslimed material in a second process to derive metal values therefrom.

11. Apparatus according to claim 10 wherein said third and fourth means have a common, electro-winning stage for alternately receiving products derived in said third and fourth means respectively.

12. Apparatus for recovering precious metal values from crushed ores, including, in combination: first means for receiving crushed ore and for separating out a majority of fines materials; second, wet-classifier means operatively disposed with respect to said first means and receiving said fines materials therefrom for separating therefrom as a first slurry a majority of slime materials; soak-leach means including a thickener operably disposed with respect to said second means and receiving said slime materials therefrom for producing an output, second slurry; means for processing said second slurry, whereby to recover precious-metal values therefrom; means operably disposed with respect to said wet-classifier means for routing oversized material therefrom to a drain stock pile; means for routing a remainder of said ores also to said drain stock pile; means for constituting at least one heap-leach pile from said drain stock pile; and means for deriving a pregnant liquor from said heap-leach pile whereby to derive precious metal values therefrom.

13. Structure according to claim 12 wherein said apparatus includes sluice box means operably interposed between said first and second means for recovering large-sized precious metal values.

* * * * *